Feb. 12, 1952 — W. T. ROSSELL — 2,585,349
MECHANICAL TRANSMISSION
Filed June 27, 1950 — 2 SHEETS—SHEET 1
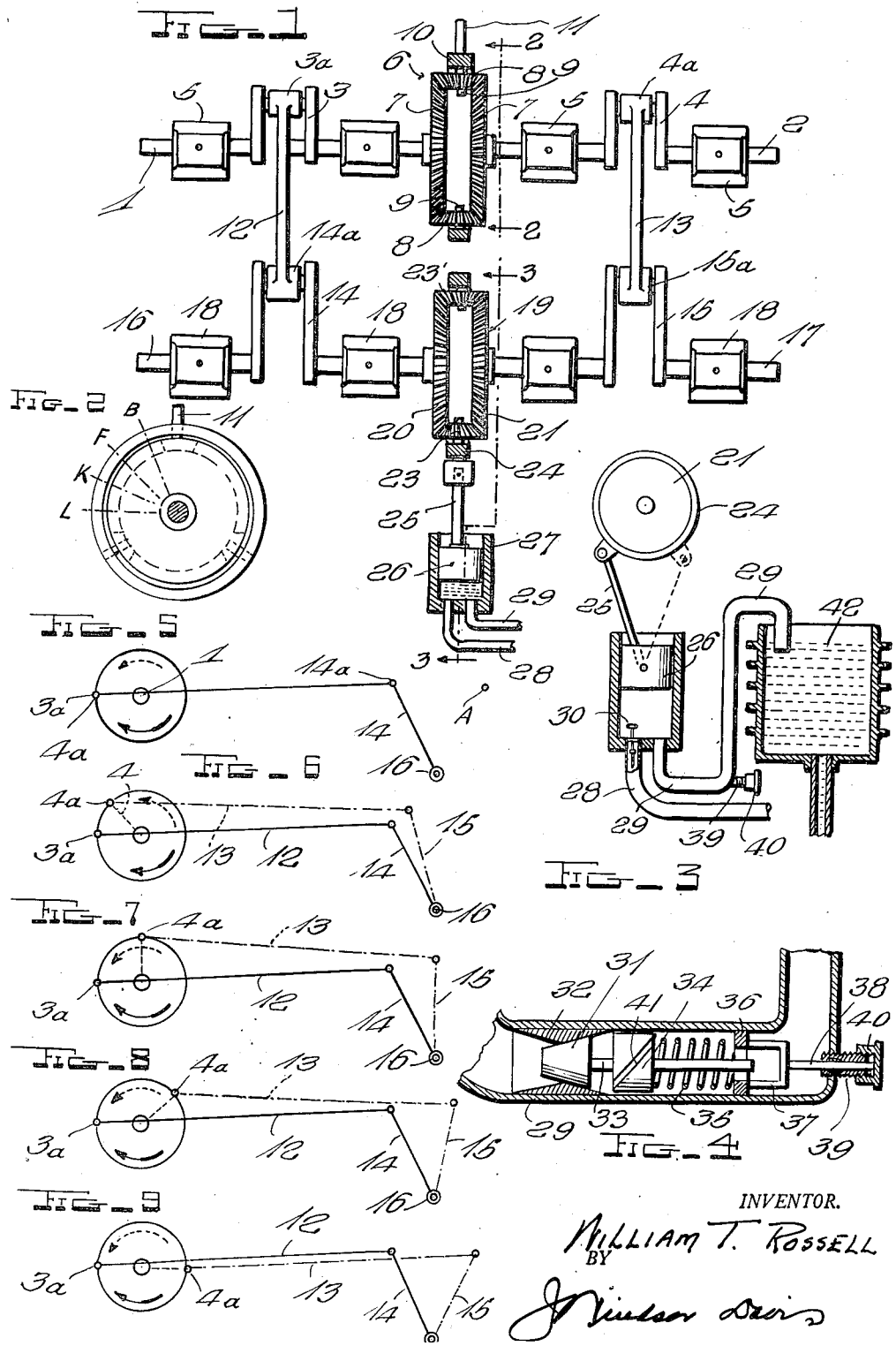
INVENTOR.
WILLIAM T. ROSSELL Feb. 12, 1952 W. T. ROSSELL 2,585,349
MECHANICAL TRANSMISSION
Filed June 27, 1950 2 SHEETS—SHEET 2
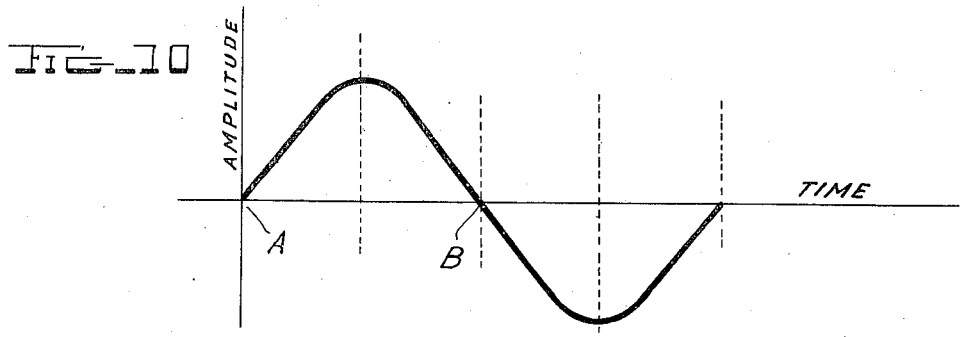
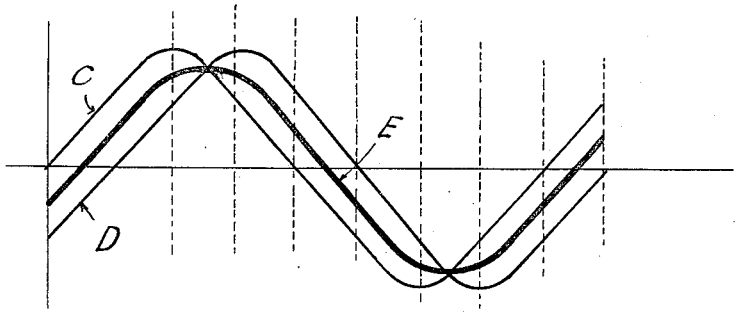
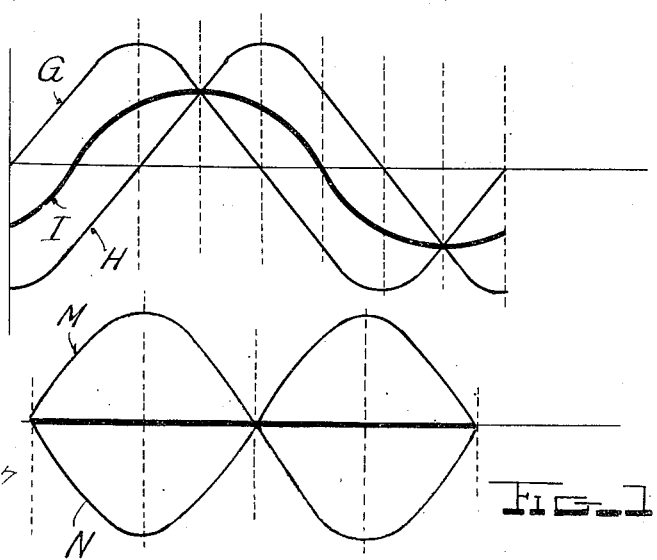
INVENTOR.
WILLIAM T. ROSSELL
BY Patented Feb. 12, 1952

2,585,349

UNITED STATES PATENT OFFICE 2,585,349

MECHANICAL TRANSMISSION

William T. Rossell, New York, N. Y.

Application June 27, 1950, Serial No. 170,599

5 Claims. (Cl. 74—25)

This invention relates to infinitely variable transmissions and has for its object to provide a transmission such that an infinitely variable reduction in speed may be made by the use of a combination of mechanical means each of which has long and proven capabilities as regards economy of manufacture and long life under severe service.

There are many devices in use today by which infinite speed ratios may be obtained. Of these, the only one now in wide use on automobiles is of the hydraulic or combination mechanical and hydraulic types. The main objection to these is their high initial cost and the high cost of maintenance in case of wear. Heretofore, no purely mechanical device has met success in a field requiring prolonged, severe service.

The principal object of this invention is to provide such a transmission composed simply of a plurality of independent cranks connected for co-ordinated operation through differential gearing and to employ the differential gearing to set up various relations between the phase relations of the cranks. More particularly, I provide a crank-shaft in which the throws are connected through a differential gearing, the pinion of the gearing being arranged for manual alteration of the phase relationship of the cranks and I then translate the motions of the cranks to a means which will respond to the differentials of the phases.

While the transmission as herein described is suitable for many and various types of speed reduction I contemplate applying it first to vehicle braking. If it is connected to a suitable shaft such as the propeller shaft or crank-shaft or to a conventional transmission shaft or to some suitable transmission gear it becomes possible to make use of its speed reducing functions to dissipate the kinetic energy of a heavy vehicle. For instance, the device may be made to operate a hydraulic pump against a heavy valve resistance in such manner that the kinetic energy of the vehicle is converted into heat in the hydraulic fluid and the heat may be dissipated by a conventional radiator. As will be further described hereinafter, the hydraulic fluid can suitably be oil from the engine oil pump and the cooling means may be the conventional oil cooler found on many engines of the type contemplated. The oil cooler may be enlarged if found desirable. The principal wear of friction brake linings will be thus eliminated.

Other objects and advantages will become hereinafter more fully apparent as reference is had to the accompanying drawings in which my invention is illustrated and in which Figure 1 is a side elevation of my improved transmission connected to a hydraulic pump, Figure 2 is a transverse section taken along the line 2—2 of Figure 1, Figure 3 is a transverse section taken along the line 3—3 of Figure 1 and showing also a section through a hydraulic fluid radiator which is connected to the pump, Figure 4 is an enlarged view of the resistance valve of Figure 3, Figures 5 to 9 inclusive are diagrams to illustrate the various major operating positions of the device of Figure 1, Figures 10 to 13 inclusive are diagrams to illustrate the resultant motions of the final driven member in response to the adjustments illustrated in Figures 5 to 9, and Figure 14 illustrates a modified form of final driven means.

More particularly, the numerals 1 and 2 designate co-axial crank-shafts having cranks 3 and 4, respectively. These shafts are supported by bearings 5 and are operatively connected by differential gearing, designated generally by the numeral 6, which gearing is composed of a sun gear 7 carried by each shaft and the usual pinions 8. There are usually three such pinions 8 altho there may be more or less. Each of the pinions 8 rotates on a shaft 9 and all shafts 9 are carried by a common ring 10. A handle 11 extends outwardly from the ring. It serves as a means by which the ring 10 is prevented from movement when its movement is not desired and it also constitutes the means by which the ring may be subjected to partial rotation for purposes to be hereinafter explained.

The crank pins 3a and 4a of the cranks 3 and 4 have connecting rods 12 and 13 rotatively connected respectively thereto, the connecting rods being also respectively rotatively connected to the crank pins 14a and 15a of the cranks 14 and 15 of two other crank-shafts 16 and 17.

It should be particularly noted that the crank throws 14 and 15 are substantially longer than the throws 3 and 4.

The shafts 16 and 17 are mounted parallel with the shafts 1 and 2 in the bearings 18 and are co-axial with each other. They are operatively connected by a differential gearing designated generally by the reference numeral 19. This differential is composed of two sun gears 20 and 21 carried, respectively, by the shafts 16 and 17, and a plurality of pinions 23 mounted on shafts which are carried by a common ring 24. The ring 24 is pivotally attached to a piston rod 25 which is connected to the piston 26 of a hydraulic pump. The piston 26 reciprocates in the pump cylinder 27. The fluid line 28 guarded by the valve 30 leads from a source of fluid supply to the cylinder 27 and the line 29 leads from the cylinder to a fluid reservoir, preferably in the form of a radiator 42.

The valve 30 may be a simple form of non-return valve and the line 28 may be supplied from the oil pump of the vehicle engine where the device is used as a vehicle brake. A valve 31 is inserted in the line 29 and is, preferably, of the type illustrated in enlarged view in Figure 4 in which it is provided with a seat 32, a valve stem 33, a valve collar 34 fixed on the stem and a closing spring 35. The spring 35 abuts against the valve collar 34 at one end and against a ring 36 at its other end. The ring 36 is made adjustable as to position in the line 29 by means of an open-sided cap or prong 37 carried by a stem 38 which extends through the line 29 and through a bushing 39 for abutment by a cap 40. The cap 40 is screw threaded onto the bushing 39 so that adjustment of the position of the cap on the bushing adjusts the compression of the spring 35. The valve collar 34 has one or more vanes 41 so that fluid escaping past the valve 31 will tend to rotate the valve thus shifting the reseating position.

The operation will now be described. Assume that the shaft 1 is being driven by some suitable source of power supply. For instance, where the device is used as a brake the shaft 1 may be connected, or connectable by a clutch or other device, to the propeller shaft of the vehicle, or to the engine crank-shaft or to a shaft of the conventional transmission so that retardation of the speed of rotation thereof by this device will act to retard the road speed of the vehicle. Rotation of the shaft 1 will cause rotation of the shaft 2 in equal and opposite direction, assuming the pinion carrying ring 10 to be held against rotation by means of the handle 11 which engages a notch of the plate 42 (Figure 2). Rotation of the shafts 1 and 2 also entails rotation of the cranks 3 and 4 and consequent actuation of the connecting rods 12 and 13.

For the reason that the cranks 14 and 15 are substantially longer than the cranks 3 and 4, actuation of the connecting rods 12 and 13 as above described will result in oscillation of the cranks 14 and 15. Oscillation of the shafts 16 and 17 will cause oscillation of gears 20 and 21, the pinions 23, the ring 24 and of the piston rod 25. This latter oscillation results in reciprocation of the piston 26 which causes an intake of fluid into the cylinder 27 and expulsion against the resistance of the valve 31 and valve spring 35.

The pressure exerted by the valve spring 35 is adjustable as may be desired. For instance, the resistance of this spring may be so set that the resistance to coasting of the vehicle will tend to adjust itself automatically to changing speed of the vehicle, which is a salient principle of this invention. Once the setting is made for a vehicle of a certain size and weight and speed range it probably will not have to be changed unless the vehicle is put to a new use or other conditions change.

Refer now to Figures 5 to 9 which illustrate major points in the various possible operating cycles. In these views the reader is standing at the left side of Figure 1 looking toward the right so that the shaft 2 is behind shaft 1 and the shaft 17 is behind the shaft 16. The connecting rod 13 and the cranks 4 and 15 are shown in dotted lines while the cranks 3 and 14 and the connecting rod 12 are shown in full lines for clarity of explanation. In Figure 5 assume that the shaft 1 is rotating in clockwise direction and, hence, that the shaft 2 is rotating in opposite direction. The cranks 3 and 4 are in their extreme left positions illustrated in Figure 1 so that the crank pin 3a is immediately in rear of the crank pin 4a and the connecting rod 13 is immediately in rear of the connecting rod 12 in Figure 5. As rotation of the shafts continue both cranks 3 and 4 and hence the cranks 14 and 15 move in unison from their extreme left position as illustrated in full lines to their extreme right position A where they will arrive together. The connecting rods 12 and 13 will thus cause exact, simultaneous oscillation of the cranks 14 and 15 and hence maximum oscillation of the ring 24. The oscillation of each crank 14 and 15 may be represented by a sine curve and in this case the sine curves will be coincident as shown in Figure 10. The resultant movement of the ring 24 will be the sum of these curves which can be represented by the curve of Figure 10. The pump will thus have a maximum stroke from the full line position of Figure 3 to the dotted line position A. As maximum fluid is pumped, the valve 31 thus has opportunity to offer maximum resistance to movement of the piston 26 and maximum braking effort occurs. It should be stated, parenthetically, that the pump may be of any desired type and may be single acting, double acting or of multiple chamber.

Now, suppose that the handle 11 of the ring 10 is moved through a 22½° angle, to a position B, Figure 2. The shafts 1 and 2, and hence the cranks 3 and 4, will be relatively rotated through a total arc of 45°. Now, if we drive the shaft 1 we see from Figure 6 that, when the crank 14 has moved upwardly to the position illustrated so that the crank 14 has completed its stroke to the left, the crank 15 is still moving toward the left but lags by a quarter of a stroke. Figure 11 shows this. The sine curve C represents the motion of the crank 14, the curve D represents the motion of the crank 15 and the heavy line E is the curve representing half the sum of the curves C and D and hence the motion of the ring 24 which is the motion imparted to the pump.

If we now move the handle 11 through an adtional 22½° or a total of 45° to the position F, Figure 2, the cranks 3 and 4 will be further relatively rotated. If we drive the shaft 1, as before, Figure 7 illustrates that when the crank 14 attains its maximum position to the left the crank 15 lags by half a stroke. In Figure 12 the curve G represents the motion of the crank 14 and the curve H represents the motion of the crank 15. The resultant curve I shows the motion imparted to the pump by the oscillations of the ring 24 which is less than the movement imparted by the two previous positions.

If we advance the handle 11 through an additional 22½° to the position K, Figure 2, we see from Figure 8 that the crank 15 now lags behind the crank 14 by three fourths of a stroke. The movement of the ring 24 will thus be further reduced.

If we now advance the handle 11 through an additional 22½° to a position L 90° removed from its initial point then the cranks 14 and 15 are in exactly opposite phase since the crank 14 is at its extreme left position, Figure 9, and the crank 15 is at its extreme right position. The motions are represented by the curves M and N, Figure 13. The resultant curve is a straight line coincident with the horizontal axis so that the motion of the ring 24 is reduced to zero.

While the foregoing has been directed to the use of the transmission as a pumping and braking means it may be used to transmit rotary motion to a shaft for other purposes. For example, a ring gear 43, Figure 14, may be secured onto the periphery of the ring 24 and its oscillations converted into rotary motion by a second gear 44 mounted on a shaft 45. Between the shaft 45 and the gear 44 is a ball type clutch 46 which limits the driving of the shaft 45 to one direction.

Various changes and adaptations may be made without departing from the spirit of my invention and I therefore desire to be extended protection as defined by the scope of the appended claims.

What I claim is:

1. The combination of two relatively oscillable shafts, a differential gearing including at least one pinion connecting said shafts, power driven crankshafts connected by differential gearing oscillating each of said shafts, said pinion oscillating through an arc having a length dependent upon the phase relationship of the oscillations of said two shafts, manual means associated with said crankshafts for varying such phase relationship whereby to vary the length of the arc of oscillation of said pinion, and means transferring the oscillating movements of said pinion to a final driven means.

2. In combination, two relatively oscillable shafts, differential gearing including at least one floating pinion connecting said shafts, said pinion having an oscillating movement dependent upon the phase relationship of said shafts during operation, two rotative crankshafts also connected by differential gearing including at least one fixed pinion whereby said shafts rotate in opposite directions, means converting the rotary motions of said crankshafts into oscillating movements of said oscillable shafts, and means converting the oscillating movements of said floating pinion into motion of a final driven member.

3. In combination, two relatively oscillable crankshafts, differential gearing including freely floating pinions connecting said crankshafts, said pinions being connected by a ring and having oscillating movements dependent upon the phase relationship of the oscillations of said shafts, two rotary crankshafts connected by differential gearing having pinions connected by a ring restrained against floating whereby said rotary crankshafts rotate in opposite directions, the crank throws of said oscillable shafts being longer than those of said rotary crankshafts, a connecting rod connecting each throw of said rotary crankshafts with a throw of said oscillable shafts, and means converting the oscillating movements of said floating pinions and ring into movement of a final driven member.

4. The combination of a pair of co-axial crankshafts, each having at least one crank throw and connected by a differential gearing whereby rotation of one of said shafts causes the other thereof to rotate in opposite direction, a second pair of co-axial crankshafts parallel with the first named pair, a connecting rod connecting each crank throw of said first pair with a crank throw of said second pair, the crank throws of said second pair being substantially longer than those of said first pair whereby the shafts of said second pair oscillate in response to rotation of said first pair, a second differential gearing connecting the shafts of said second pair, said second differential gearing including pinions connected by a ring which oscillates according to the relative movements of the oscillating shafts, and means transferring the oscillating movements of said ring to a final driven means.

5. The combination of a pair of co-axial crankshafts each having at least one crankthrow, differential gearing connecting said shafts and having pinions carried by a common fixed ring whereby said shafts rotate in opposite directions, a second pair of co-axial crank-shafts also having at least one crank-throw each, connecting rods connecting each of the throws of the first pair with a throw of the second pair, the throws of the second pair being longer than the throws of the first pair whereby rotation of said first pair causes said second pair to oscillate, differential gearing connecting the members of said second pair, said differential gearing of the second pair including pinions attached to a common ring which is free to float through oscillatory movements dependent upon the phase relationship of the oscillations of said second pair, and manual means for rotating the first ring of the differential of said first named pair thereby altering the phase relationship of said second pair, and means converting the oscillating movements of the ring of the differential of said second pair into movement of a final driven member.

WILLIAM T. ROSSELL.

REFERENCES CITED

The following references are of record in the file of this patent:

UNITED STATES PATENTS

| Number | Name | Date |
|---|---|---|
| 1,827,655 | Haubert | Oct. 13, 1931 |
| 2,232,252 | Mathey | Feb. 18, 1941 |
| 2,328,306 | Svoboda | Aug. 31, 1943 |